United States Patent [19]

Fredin

[11] Patent Number: 4,489,975
[45] Date of Patent: Dec. 25, 1984

[54] SUPPORT APPARATUS FOR A RAISED SIDE PANEL OF A TRUCK OR TRAILER

[75] Inventor: Sture Fredin, Bjuråker, Sweden

[73] Assignee: Thycho Fredin AB, Bjuråker, Sweden

[21] Appl. No.: 416,388

[22] Filed: Sep. 9, 1982

[30] Foreign Application Priority Data

Sep. 14, 1981 [SE] Sweden ............................ 8105453

[51] Int. Cl.³ .................... B62D 33/00; B60P 03/04; B61D 17/00
[52] U.S. Cl. .................................... 296/181; 296/14; 49/197; 49/204; 105/378
[58] Field of Search ............... 296/50, 53, 56, 181, 296/183, 32, 184, 14, 36, 100; 105/378; 298/23 MD, 23 D, 18; 49/197, 199, 203–205, 200, 253

[56] References Cited

U.S. PATENT DOCUMENTS

| | | | |
|---|---|---|---|
| 2,711,343 | 6/1955 | Falk et al. | 296/56 |
| 4,140,339 | 2/1979 | Fredin | 296/100 |
| 4,268,084 | 5/1981 | Peters | 296/100 |

Primary Examiner—Robert B. Reeves
Assistant Examiner—Dennis H. Pedder
Attorney, Agent, or Firm—Witherspoon & Hargest

[57] ABSTRACT

The invention relates to a support arrangement for a truck or trailer having a stationary side wall (2) and a maneuverable side member or wing (3). In order to avoid excessive stress on the side member (3) there is provided according to the invention a support arrangement which includes a substantially horizontal cantilever (12) which at one of its ends is secured to the stationary side wall (2) of the trailer and which at its other free end supports a bracket (15) in which two side member arms (9) and a side member support (10) positioned between the side member arms are rotatably mounted. The side member arms (9) are at their other ends rotatably mounted in the upper edge of the side member (3) and the side member support (10) is adapted to support the side member (3) with its free end when the side member is in its raised position. Furthermore the support arrangement includes means for transferring the movement of the side member arms (9) to the side member support (10) at a predetermined position of the side member arms and a carrier (11) for returning the side member support (10) to its initial position by the closing of the side member.

6 Claims, 9 Drawing Figures

SUPPORT APPARATUS FOR A RAISED SIDE PANEL OF A TRUCK OR TRAILER

BACKGROUND OF THE INVENTION

1. Field of the Invention

The invention generally relates to trucks or trailers having a maneuverable side member or wing which may be raised up and over the truck or trailer usually by hydraulic means, for permitting loading and unloading from the side thereof, and relates more particularly to a support arrangement for such a maneuverable side member or wing.

2. Description of the Prior Art

In order to permit transportation of piece goods in trucks and trailers, and especially perishable piece goods such as paper bales and corrodible goods, it is necessary that a proper covering of the truck or trailer be provided in order to make it possible to transport such goods without the risk of them being damaged by rain, snow, wind or road dirt. For this purpose there has previously been used different kinds of superstructures over the load platform of the truck or tarpaulins which have been stretched across the load platform by means of sticks. These solutions have suffered from serious disadvantages since they have either been very expensive and/or have made the loading and unloading more difficult while simultaneously restricting the range of application for the truck.

A structure which has been improved in the above sense is illustrated in the Swedish patent specification No. 402 740, according to which the side member by the load platform is raised upwardly and over the platform at the same time as a tarpaulin which fully or partly covers the upper part of the platform is brought aside. With this structure the whole side between the actual load platform and the upper portion of the truck or trailer is exposed to facilitate the loading and unloading from the side by means of fork lifts or the like. A portion of the platform "roof" is also exposed. The result of this is that it is also possible to load or unload the truck or trailer by means of a crane. Moreover said solution also guarantees that the frame of a fork lift or the like used during loading and unloading cannot strike against any part of said "roof" and be damaged. However, one problem encountered in connection with trucks or trailers of the last mentioned kind, where a greater or lesser portion of the platform "roof" is exposed when the side member is raised, is that the side member or wing will be exposed to excessive load since the side member will bend down towards its middle. This is especially true regarding longer trucks or trailers, some of which have lengths of up to 24 meters. For that reason it has been necessary to provide some kind of support for the side member or wing. In such trucks or trailers these supports have up to now generally been formed by a partition wall against which the side member is supported in its raised position, but this solution is particularly unsuitable since such a partition wall restricts the length of the goods that may be transported to less than half the length of the truck or trailer.

SUMMARY OF THE INVENTION

The purpose of the present invention is thus to provide, for use with the above mentioned kind of truck or trailer having a maneuverable side member or wing which may be raised up and over the truck or trailer for permitting loading and unloading from the side thereof, a support arrangement for the side member or wing which does not restrict the load capacity of the truck or trailer.

The above mentioned purpose is achieved by means of an arrangement of the kind indicated in the claims. From the claims the significant characteristics of the invention are also clear.

BRIEF DESCRIPTION OF THE DRAWING

The invention is more clearly described below in connection with the enclosed drawings, in which.

DESCRIPTION OF THE PREFERRED EMBODIMENT

Figure 1:
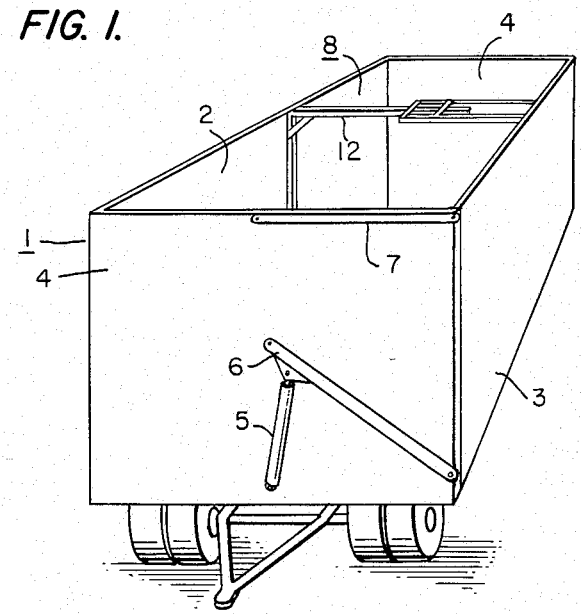
FIG. 1 is a schematic perspective view of a trailer provided with the support arrangement according to the invention and illustrated with the side member in its lowered, closed position.

Although the invention is illustrated and described in the drawings and in the description installed on a specific type of trailer having a hydraulically maneuverable side member it should be understood that it may be used on any kind of motor vehicle or trailer where a side member or wing is raised up and over the platform. Examples include vehicles for the transportation of bulk goods, such as chip, splint, bark, turf, stubs or insulating material. Thus the invention may, for example, also be used by vehicles or trailers where the side member is maneuvered by means of electric motors, pressurized air and so forth, or where a tarpaulin is attached to the upper edge of the side member and to the stationary side as well as to parts of the end walls as in accordance with said Swedish patent specification No. 402 740.

The trailer 1 illustrated in FIG. 1 consists of a stationary side wall 2, a maneuverable wing or side member 3 arranged opposite to the stationary side wall 2, and two opposite end walls 4. The side member or wing 3 is in the illustrated embodiment maneuvered by means of hydraulic cylinders 5 one end of each of which is pivotally journalled to end wall 4. At their other ends the hydraulic cylinders 5 are pivotally connected to a lifting arm 6. The lifting arm 6 is in turn pivotally mounted with one end thereof coupled to the end wall 4 and with its other end coupled to the lower portion of the side member 3. Furthermore a control arm 7 is provided which is pivotally mounted to the end wall 4 adjacent the upper portion thereof, and which at its other end is pivotally mounted to the upper end of the side member 3 for guiding the side member up and over the platform by the lifting movement of the cylinder 5.

Figure 2:
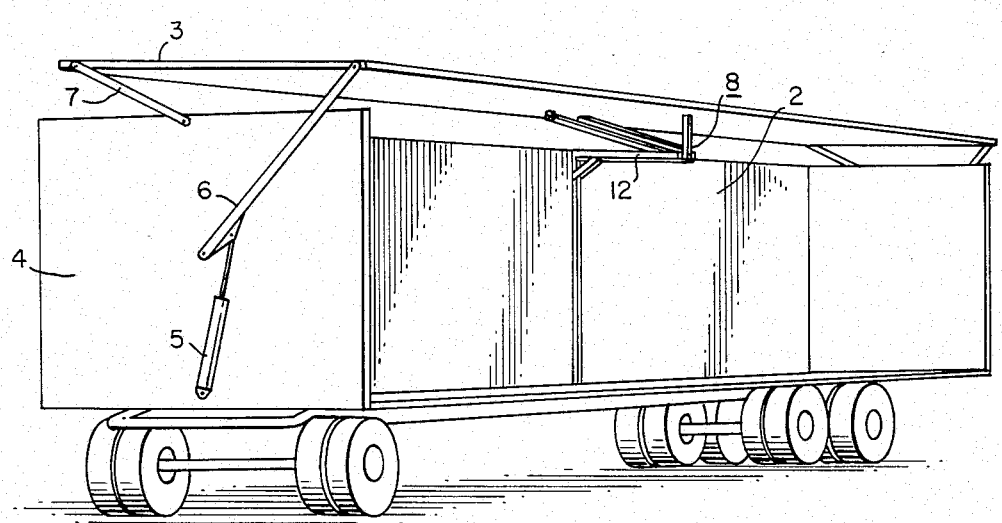
FIG. 2 is a side perspective view of the vehicle illustrated in FIG. 1 with the side member or wing in its raised position, FIGS. 3a and b are detailed views from the side and from above respectively of the support arrangement in the lowered or closed position for the side member or wing.

In a trailer according to FIG. 1 the maneuverable side member is, as mentioned above, exposed to substantial load in its raised position when the trailer is of considerable length. In the Figures there is illustrated a support arrangement 8 according to the invention which is positioned near the middle of the trailer, with respect to its length, in order to prevent the side member from bending down towards its middle when it is raised in the way illustrated in FIG. 2.

Figure 3A:
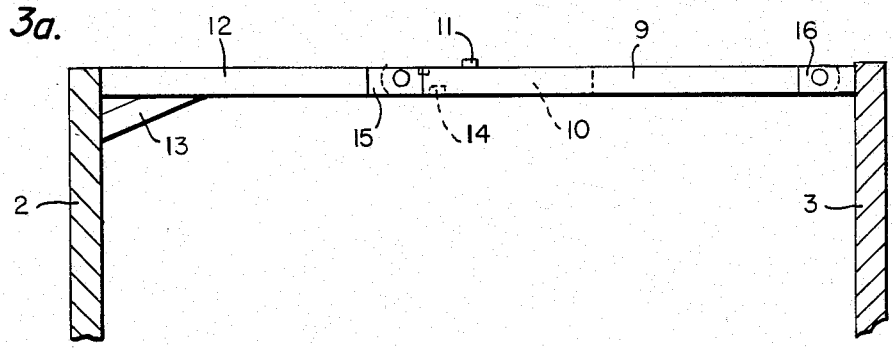
Figure 3B:
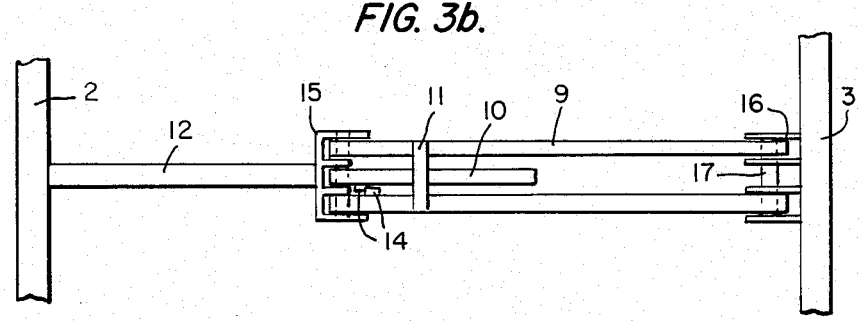

From FIGS. 3a and 3b it is clear that the support arrangement comprises a horizontal cantilever 12 which is attached with one of its ends to the stationary side wall 2 of the trailer and which is supported by means of a brace 13. Preferably the horizontal cantilever 12 is attached to a reinforcing beam in the stationary side wall of the trailer. A bracket 15 is secured to the free end of the cantilever 12, and in said bracket two outer side member arms 9 and a central side member support 10 are mounted in such a way that they are rotatable independently of each other around a pin or the like in the bracket 15. The side member arms 9 are in their opposite ends rotatably journalled around a pin 17 in a bracket 16 which is secured to the upper edge of the side member 3. The side member support 10 is of considerably less length than the side member arms 9 and is positioned substantially in the center of the vehicle relative to the width thereof. Side member support 10 is cantilevered and preferably rests on a stop in the bracket 15, which stop prevents the side member support 10 from swinging down below the horizontal plane. On the upper side of the side member arms 9 a carrier 11 is provided which is extended between the side member arms, and the function of the carrier will be described more clearly below. By the illustrated embodiment lugs 14 are furthermore provided on the side member support 10 and on at least one one of the side member arms 9. These lugs cooperate with each other for lifting up the side member support by the maneuvering of the side member 3 up and over the platform, and this will also be more closely decribed below.

Figure 4A:
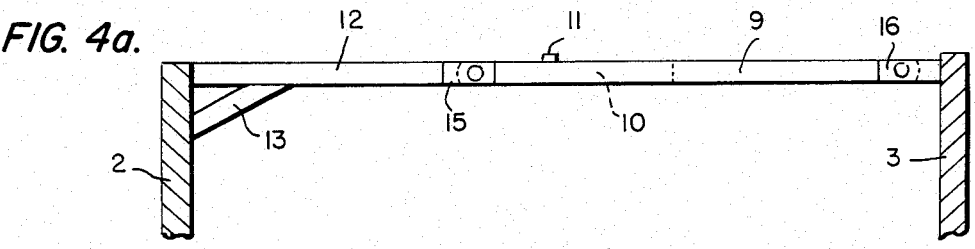
FIGS. 4a-e illustrate the support arrangement in different positions by the maneuvering of the side member.
Figure 4B:
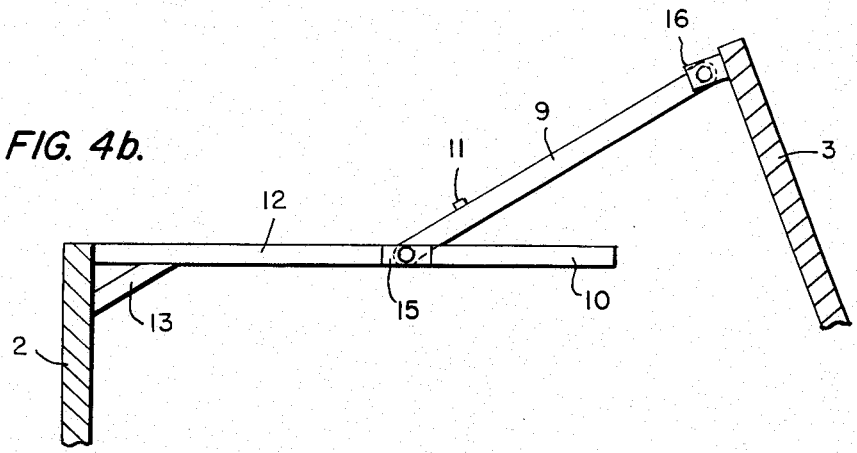
Figure 4C:
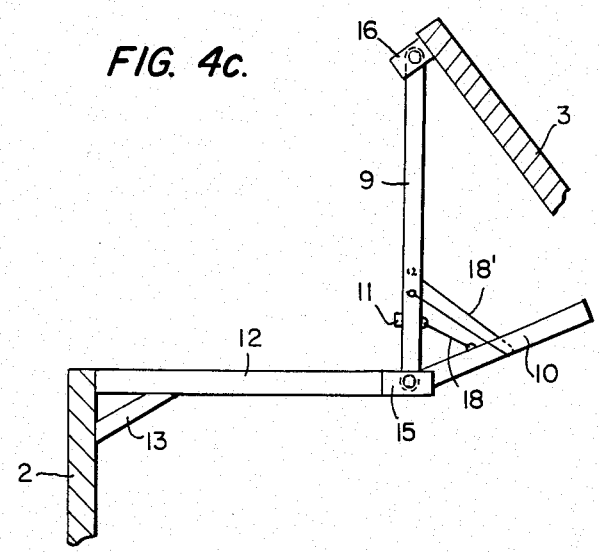
Figure 4D:
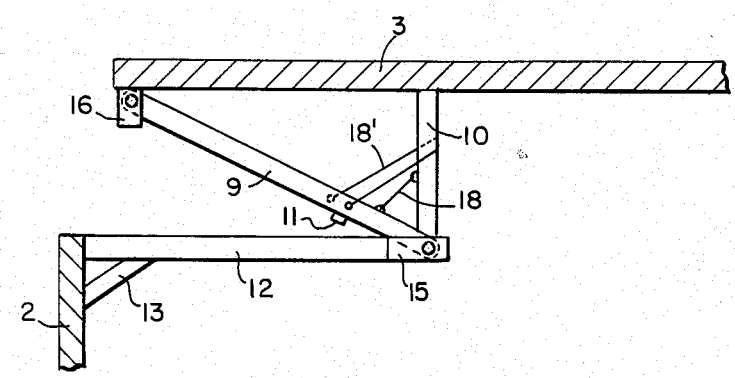
Figure 4E:
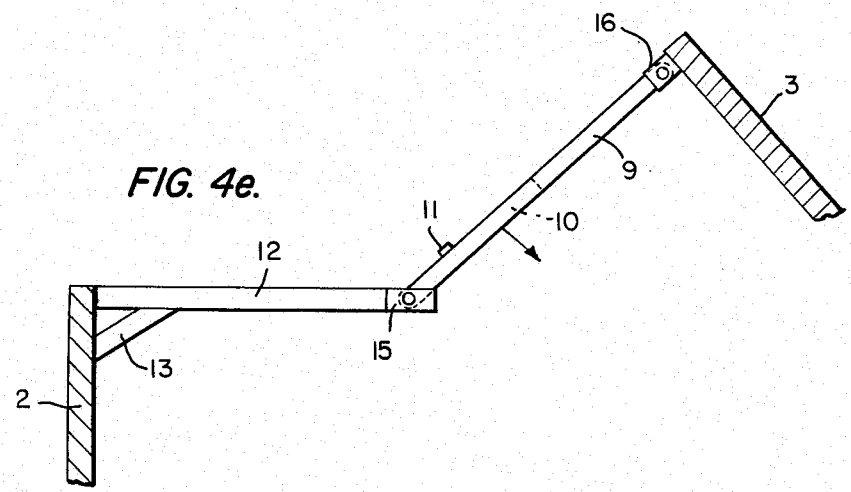

The operation of the support arrangement according to the invention will be described more closely below with reference to FIGS. 4a–e. FIG. 4a illustrates the initial position where the side member 3 is fully closed, and thereby the side member support 10 as well as the side member arms 9 are extended substantially horizontally. When the swinging movement of the side member 3 up and over the trailer is started by means of the hydraulic cylinders 5 the side member arms 9 will, as is clear from FIG. 4b be rotated upwardly. Initially, before the lugs 14 of the side member support 10 and one of the side member arms 9 have contacted each other, the side member support 10 will remain extended substantially in a horizontal direction. It should also be pointed out that as is clear from FIG. 4d the lugs 14 may be replaced by a chain or wire 18 which is stretched between one side member arm 9 and the side member support 10 or between the two side member arms under the side member support 10. In such an embodiment, the chain or wire 18 pulls the side member support 10 upwardly when the side member arms 9 have rotated a predetermined distance. In FIG. 4c the support arrangement is illustrated in its position when the side member has been brought so far up and above the platform that the lugs 14 have contacted each other and the side member support has thus started to rotate upwardly. FIG. 4d illustrates the side member in its fully raised position, and as is clear the side member support 10 has thereby been rotated such that it is extended substantially in a vertical direction and in such a way that its free upper end rests against the side member and supports the same. It is especially advantageous for the side member support 10 to support the side member substantially in its center where a heavy reinforcement beam usually is positioned, so that the stress on the side member is reduced even further. In FIG. 4e the support arrangement is illustrated in its position when the side member is being brought back towards its lowered position. As is clear the side member arms 9 engage the side member support 10 by means of the carrier 11 when they are swung downwardly to return the entire arrangement to its initial position when the side member has reached its fully closed position.

Even if the invention in the drawings and in the description has been illustrated and described with reference to a preferred embodiment thereof it should be clear that changes and modifications thereof may be performed by a man skilled in the art within the scope of the invention.

I claim:

1. A support apparatus for a vehicle having a stationary side wall and a maneuverable side member arranged opposite to said side wall, said side member being rotatably mounted to said vehicle so that said side member can be rotated to a raised position above said vehicle and subsequently to a lowered position comprising a cantilever having one end attached to said side wall and an opposite end extending towards said side member;

a bracket attached to said opposite end;

first and second side member arms spaced from each other and each having a first end rotatably mounted to said bracket and a second end rotatably mounted to said side member;

a side member support positioned between said side member arms and having an end rotatably mounted to said bracket and an opposite free end extending, in a first position, towards said side member;

means attached to said side member support and at least one of said side member arms for causing said side member support to be rotated from said first position to a predetermined second position, when said side member is rotated to a raised position above said vehicle, so that said free end supportively engages said side member; and, a carrier extending between said side arms, attached thereto and positioned above said side member support for engagement with said side member support, when said side member support is rotated to a lowered position, to return said side member support to said first position.

2. The apparatus of claim 1 wherein said means includes a first lug attached to at least one of said side member arms and a second lug attached to said side member support, said lugs being spaced relative to each other so that as said side member rotates to a position above said vehicle, said first lug engages said second lug to rotate said side member support to said predetermined position.

3. The apparatus of claim 1 wherein said means includes a chain or wire extending between and attached to said side member arms and positioned below said side member support for engagement with said side member support, when said side member is rotated to a raised position above said vehicle, so that said free end supportively engages said side member.

4. The apparatus of claim 1 wherein said means includes a chain or wire one end of which is attached to one of said side member arms and the other end of which is attached to said side member support.

5. The apparatus of claim 1 wherein said cantilever is attached about to the middle of said stationary side wall relative to the length thereof.

6. The apparatus of claim 1 wherein said side member support is positioned substantially in the center of said vehicle relative of the width thereof.

* * * * *